Figure 1:
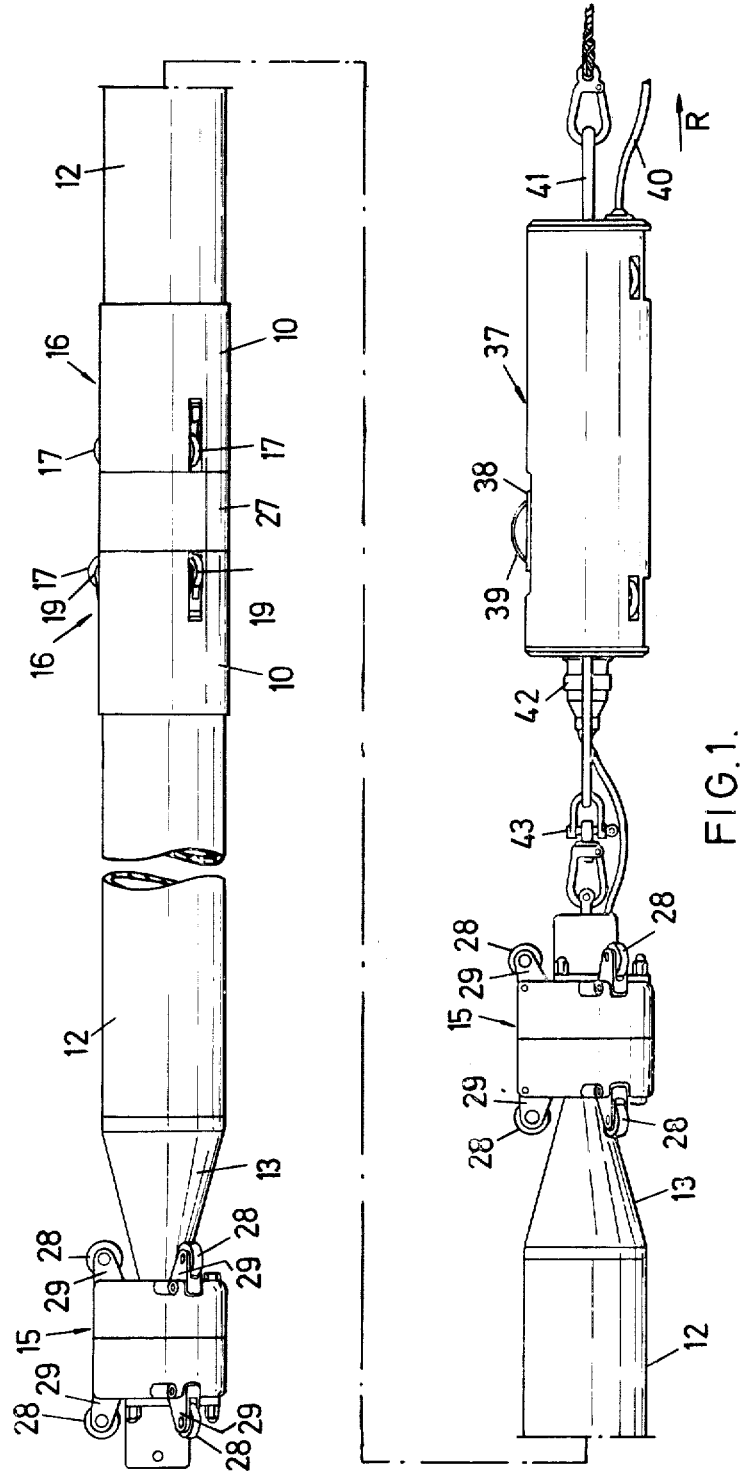

United States Patent [19]

Lowen

[11] 3,886,665

[45] June 3, 1975

[54] MONITORING APPARATUS

[75] Inventor: Michael David Lowen, Berkhamsted, England

[73] Assignee: John Laing & Son Limited, London, England

[22] Filed: Apr. 24, 1973

[21] Appl. No.: 354,070

[30] Foreign Application Priority Data
May 4, 1972 United Kingdom............... 20794/72

[52] U.S. Cl. ........................... 33/174 R; 33/174 L
[51] Int. Cl. ........................ G01b 5/20; G01b 5/24
[58] Field of Search .. 33/1 H, 174 R, 174 L, 178 E, 33/178 F

[56] References Cited
UNITED STATES PATENTS

| | | | |
|---|---|---|---|
| 1,417,703 | 5/1922 | Waffenschmidt | 33/174 R |
| 2,834,113 | 5/1958 | Dean et al. | 33/141.5 |
| 3,496,644 | 2/1970 | Short | 33/174 R |
| 3,500,549 | 3/1970 | Smith | 33/174 R |
| 3,780,442 | 12/1973 | Gresho | 33/174 R |
| 3,789,511 | 2/1974 | Groom et al. | 33/174 L |

*Primary Examiner*—Richard E. Aegerter
*Assistant Examiner*—Richard R. Stearns
*Attorney, Agent, or Firm*—Kenyon & Kenyon Reilly Carr & Chapin

[57] ABSTRACT

A monitoring apparatus for measuring the varying radii of curvature along the axis of a bore which may comprise the internal surface of a pipe, or a borehole formed in rock. The apparatus comprises an elongated body member having a roller assembly articulatedly mounted at each end adapted to accurately position the axis of the body member relative to the bore or member, the roller assemblies being spaced a predetermined distance from one another to define a chord length. Measuring means are positioned relatively to the body member for indicating the length of the offset over the chord length referred to above and then this figure is related by tables or calculation to the associated radius of curvature.

11 Claims, 8 Drawing Figures

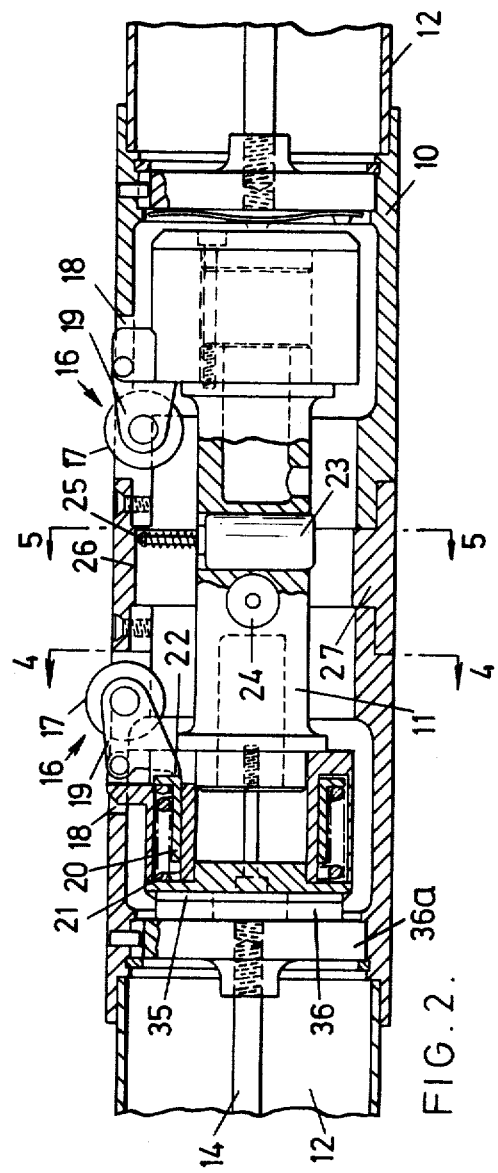
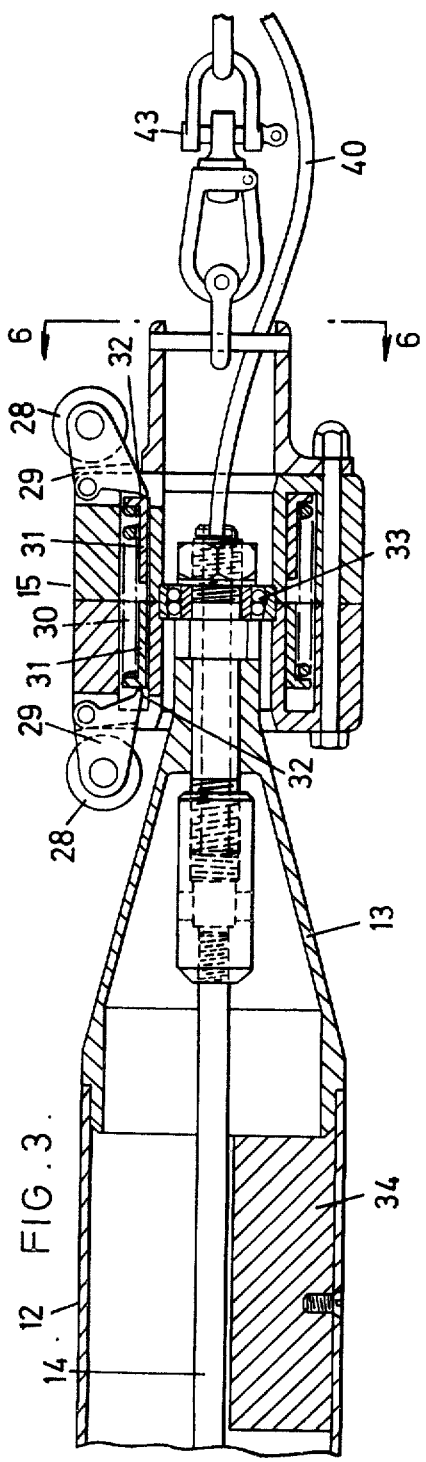

MONITORING APPARATUS

The present invention relates to monitoring apparatus for measuring the varying radii of curvature along the axis of a bore which may comprise the internal surface of a vertically or horizontally disposed pipe, or a borehole formed in rock. When in the form of a horizontally disposed pipe positioned in, or on, the ground, the pipe may accommodate waveguide tubes which are required to be laid within extremely accurate limits of minimum permitted radius.

The principle of operation of the apparatus is to measure the offset over a known chord and then relate this figure by tables or calculation to the associated radius. By the term "offset" is meant the maximum distance between the chord of a circle and the circumference thereof taken on a line normal to the chord. In practice, when the apparatus is used in a horizontal position measurements are taken simultaneously on the horizontal and vertical axes which enable the resultant offset and consequently both the magnitude and direction of the curvature to be ascertained.

In the specific embodiment hereinafter described the chord length is 1.500 metres and when plotting increasing radii of curves from 100 metres to 3 kilometres against this chord length, a range of offsets from 2.800 to 0.094 millimetres is obtained.

Figure 4:
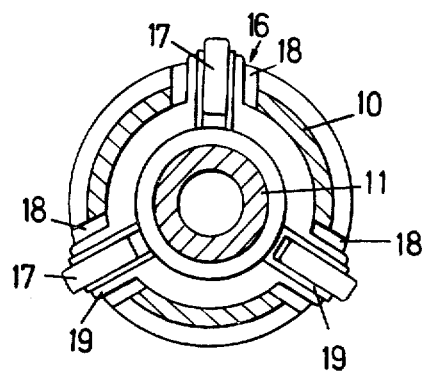
Figure 5:
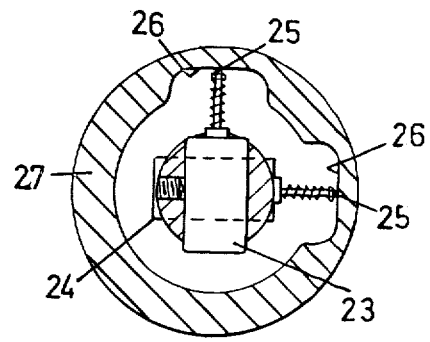
Figure 6:
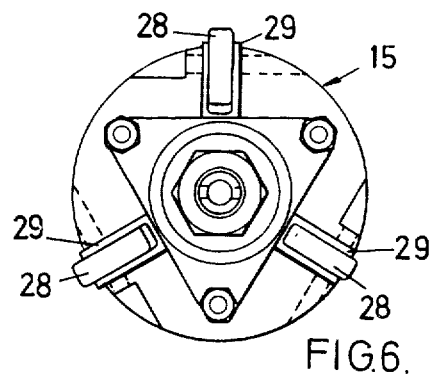
Figure 7:
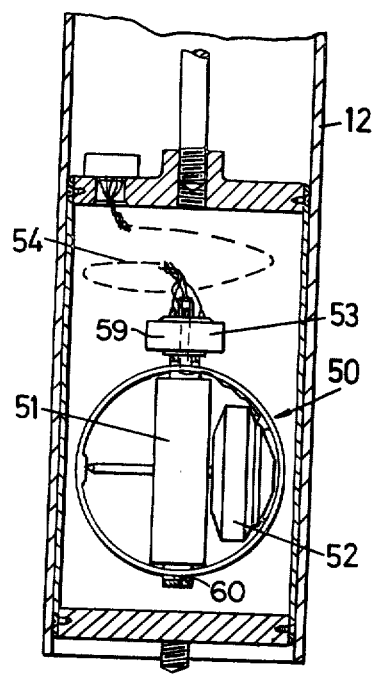
Figure 8:
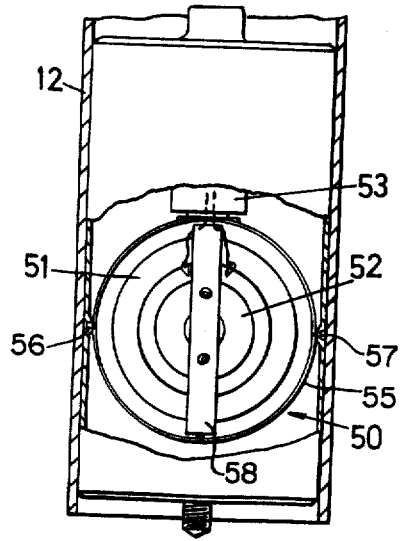

In the accompanying drawings:

FIG. 1 is a side view, partly in section, of a monitoring apparatus according to the present invention for use in a horizontally disposed pipe, FIG. 2 is a side view, partly in section and on an enlarged scale, of the transducer carriage partly visible in FIG. 1, FIG. 3 is a side view, partly in section and on an enlarged scale, of one of the bogie assemblies shown in FIG. 1, FIG. 4 is a section taken on the line 4—4 of FIG. 2, FIG. 5 is a section taken on the line 5—5 of FIG. 2, FIG. 6 is a section taken on the line 6—6 of FIG. 3, FIG. 7 shows part of a modified monitoring apparatus according to the present invention for use in a vertically disposed pipe, and FIG. 8 is a side view of the modified monitoring apparatus shown in FIG. 7.

The present invention consists in a monitoring apparatus for measuring the varying radii of curvature along the axis of a conduit or member, said apparatus comprising an elongated body member having means articulatedly mounted at each end adapted to accurately position the axis of the body member relative to the conduit or member, said body positioning means being spaced a predetermined distance from one another to define a chord length and measuring means positioned relatively to said body member for indicating the length of the offset hereinbefore defined.

In carrying the invention into effect according to one convenient mode, by way of example, the monitoring apparatus basically comprises a centrally disposed sleeve 10 accommodating a transducer carriage 11 (FIG. 2) with a tubular body member 12 having tapered end portions 13 extending in axial alignment from each end of the sleeve 10 and so maintained by means of a tie rod 14, there being a bogie or support assembly 15 universally mounted on the extremity of each tapered end portion 13.

The transducer carriage 11 includes spaced roller assemblies 16, each of which comprises three pivotally mounted rollers 17 (see FIG. 2) equidistantly spaced 120° apart which, respectively extend through longitudinally extending slots 18 formed in the sleeve 10. Each roller 17 is mounted on the extremity of a cranked arm 19 and is urged outwardly by a flanged sleeve 20 which is engaged by a spring 21. The flanged sleeve 20 engages the radially innermost portion 22 of the arm the arrangement being such that the center of the carriage is coincident with the longitudinal axis of the pipe.

Two transducers 23, 24 are mounted at right angles to each other in the central portion of the carriage 11 each having a sensor member 25 which is spring-urged outwardly from each transducer 23, 24 into engagement with a plane inner surface 26 of a reference ring 27 fixedly mounted on the sleeve 10. Each transducer 23, 24 consists of a linear variable differential transformer having its own built-in oscillator and demodulator and filter so that the output of the transducer is DC which is directly related to one position of its sensor member 25 which is connected to, or forms part of, the movable core of the differential transformer. In use the transducers 23, 24 measure the radial displacements of the carriage 11 on two axes with reference to the monitor body member 12. That is, since the center of the carriage 11 is coincident with the axis of the pipe and since the axis of the body member 12 is accurately maintained, as noted below, the displacement of the center of the carriage 11 with respect to the axis of the body member 12 can be determined.

Each bogie assembly 15 is similar to the transducer carriage 11 in that it includes spaced roller assemblies, each of which comprises three equally spaced elements such as rollers 28 (FIGS. 3 and 6) which are spring-urged outwardly to engage the inner surface of a laid pipe when in use in order to accurately position the axis of the body member 12 relative to the bore of the pipe. Each roller 28 is mounted on the extremity of a cranked arm 29 which are urged in opposite directions by a spring 30 positioned between flanged sleeves 31 which, respectively, engage the radially innermost portions 32 of the arms 29. Each bogie assembly is mounted on its associated tapered end portion 13 by means of a self-aligning bearing 33 upon which the monitor body member 12 articulates during its movement through a pipe. It will be appreciated that the mounting of the monitor body member 12 on the spaced bogie assemblies 15 reduces the effect of surface irregularities in the laid pipe on the measurements being recorded. The distance between the mid-circumferential planes of the respective bearings 33 i.e., the spacing of the bogies 15 from each other constitutes the effective chord length of the apparatus for the measurements being taken and, in the apparatus now being described, such chord length is 1.500 metres.

A ballast weight 34 or weights are mounted in the lower portion of the monitor body 12 to maintain it in a predetermined position relative to the pipe being measured to ensure that the transducers 23, 24 are substantially vertically and horizontally disposed. Likewise, one end of the transducer carriage 11 is provided with sliding abutment members 35 which engage a circular plate 36, in turn, slidably mounted against a slotted bulkhead 36a dowelled into the sleeve 10 thus preventing rotation of the transducer carriage relative to the sleeve 10.

In use, a distance measuring device 37 is moved through the pipe with the monitoring apparatus in order that the position of the latter along the pipe can be accurately determined at any instant. The measuring device comprises a wheeled carriage 38 having a hard chromium-plated wheel 39 of known circumference spring-urged into contact with the inner surface of the pipe. Revolutions of this wheel 39 are detected both in sense and number which enables the position of the monitoring apparatus to be determined.

Signals from the monitoring apparatus and distance measuring device are transmitted through a multi-core cable 40 connected to the front end of the distance measuring device 37 which is also provided with a towing eye 41. The rear end of the device 37 is provided with a multi-way socket 42 and articulated shackle 43 for attachment to the front bogie assembly 15 of the monitor.

During its movement through the pipe in the direction indicated by the arrow R (FIG. 1) signals of the vertical and horizontal measurements transmitted by the transducers 23, 24 are fed to a read-out apparatus where the figures may be compared with theoretical figures, or used independently to assess the degree of attenuation which will be present in a waveguide installed in the pipe. Alternatively the figures could be used to provide a simple accept/reject reading once limits are determined.

It will be appreciated that the present invention can be used to measure the varying radii of curvature of other members.

FIGS. 7 and 8 show a modification of the monitoring apparatus according to the present invention intended for use in a vertical attitude. The apparatus is similar to that described with reference to FIGS. 1 to 6, except that a gyroscopic unit 50 is mounted in the body member 12 in place of the ballast weight 34.

In use, the apparatus is allowed to rotate without restraint about its longitudinal axis (disposed vertically) and means are provided for sensing the direction or angular position of the apparatus about this axis, which means includes a flywheel 51 and motor 52 mounted for movement relative to the body 12 of the apparatus about its longitudinal axis. The unit 50 is connected to the shaft of a rotary potentiometer 53 connected to the apparatus body 12 so that rotation of the apparatus body 12 about its vertical axis will cause rotation of the body of the potentiometer 53 relative to the unit 50. The resistance across leads 54 of the potentiometer 53 is then used to determine the angular position of the apparatus and permit the measurements from the two transducers 23, 24 to be interpreted correctly.

The motor 52 is mounted in gimbals formed by an inner ring 58 which is free to rotate within an outer ring 55 which is, in turn, pivotally mounted on pivots 56 and 57 which are fixedly related to the body 12.

This arrangement constitutes the gyroscopic unit 50 and affords complete freedom of movement between the body 12 and the flywheel 51 thus relieving the flywheel 51 from any disturbing precessive forces.

The rotary potentiometer 53 which is capable of unrestricted rotation is positioned with its body connected to the outer ring 55 which has its shaft 59 forming the upper pivot for the inner ring 58 which, in turn, has a lower pivot 60.

Flying leads to the motor 52 passing through the shaft 59 and those to the rotary potentiometer are so disposed as to offer a minimum of restraint to movement of the unit 50.

It is known that a flywheel mounted in such a manner as described to form the unit 50 will, when rotated at a high speed on its spindle, maintain its orientation with respect to the azimuth.

From this it will be seen that rotation of the body 12 about its vertical axis will carry the outer ring 55 and its associated potentiometer 53 around the shaft 59 which is connected to the inner ring 58 carrying the flywheel 51 and motor 52.

The resultant action of the potentiometer causes a change of resistance across the potentiometer leads. By applying a voltage across these leads and observing the subsequent change of voltage on a suitable meter, the whole apparatus may be calibrated to relate meter reading to direction.

I claim:

1. A monitoring apparatus for measuring varying radii of curvature along an axis of a bore, said apparatus comprising
    an elongated rigid body member for traversing within the bore, said body member having a longitudinal axis;
    a pair of supporting assemblies spaced a predetermined distance from each other to define a chord along said axis of said body member, each said support assembly being universally mounted at a respective end of said body member and having at least three elements urged outwardly to engage an inner surface of the bore to accurately position said axis of said body member relative to the bore;
    a carriage mounted for radial movement relative to said body member, said carriage including means engaging said inner surface of the bore for centering said carriage with respect thereto; and
    measuring means mounted on said carriage for indicating radial displacements of said carriage relative to said body member to determine the distance between said chord and the inner surface of bore taken on a line normal to said chord.

2. A monitoring apparatus as claimed in claim 1 wherein said carriage is positioned within said body member.

3. A monitoring apparatus as claimed in claim 1 wherein said measuring means comprises two transducers mounted on said carriage at right angles to each other.

4. A monitoring apparatus as claimed in claim 3 wherein said body member has a reference ring fixedly mounted thereon and each transducer has a sensor member urged outwardly into engagement with an inner surface of said reference ring.

5. A monitoring apparatus as claimed in claim 1 wherein said centering means comprises spaced roller assemblies each having rollers spring-urged outwardly through slots formed in said body member to coincide the center of said carriage with the axis of the bore.

6. A monitoring apparatus as claimed in claim 1 wherein said carriage includes abutment means slidably engaging a slotted bulkhead in said body member to prevent rotation of said carriage relative to said body member.

7. A monitoring apparatus as claimed in claim 1 wherein each supporting assembly comprises a roller assembly.

8. A monitoring apparatus as claimed in claim 7 which includes a self-aligning bearing mounting each respective roller assembly on a respective end of said body member.

9. A monitoring apparatus as claimed in claim 1 which includes ballast means mounted in said body member for maintaining said body member in a predetermined position relative to the bore being measured.

10. A monitoring apparatus as claim in claim 1 which further comprises means including a gyroscopic unit and potentiometer mounted in said body member for determining an angular position of the apparatus in a vertical bore.

11. A monitoring apparatus as claimed in claim 1 which further includes a measuring device for measuring the longitudinal distance moved by the apparatus in a bore.

* * * * *